United States Patent
Weng et al.

(10) Patent No.: US 10,843,961 B2
(45) Date of Patent: Nov. 24, 2020

(54) IG WINDOW UNIT INCLUDING LAMINATED SUBSTRATES FOR PREVENTING BIRD COLLISIONS

(71) Applicant: Guardian Glass, LLC, Auburn Hills, MI (US)

(72) Inventors: Jian-gang Weng, Canton, MI (US); Sarah Wansack, Auburn Hills, MI (US); Greg Brecht, Grosse Point Farms, MI (US); Robert A. Vandal, Syracuse, IN (US)

(73) Assignee: GUARDIAN GLASS, LLC, Auburn Hills, MI (US)

( * ) Notice: Subject to any disclaimer, the term of this patent is extended or adjusted under 35 U.S.C. 154(b) by 92 days.

(21) Appl. No.: 16/133,822

(22) Filed: Sep. 18, 2018

(65) Prior Publication Data

US 2019/0084874 A1    Mar. 21, 2019

Related U.S. Application Data

(60) Provisional application No. 62/559,684, filed on Sep. 18, 2017.

(51) Int. Cl.
*B32B 15/04* (2006.01)
*B32B 17/06* (2006.01)
(Continued)

(52) U.S. Cl.
CPC ......... *C03C 17/3618* (2013.01); *A01M 29/08* (2013.01); *B32B 17/10055* (2013.01);
(Continued)

(58) Field of Classification Search
USPC .......................... 428/426, 428, 432, 434, 688
See application file for complete search history.

(56) References Cited

U.S. PATENT DOCUMENTS 3,682,528 A   8/1972   Apfel et al.
4,898,790 A   2/1990   Finley
(Continued)

FOREIGN PATENT DOCUMENTS

WO    WO 2016/198901    12/2016
WO    WO 2017/011268    1/2017

OTHER PUBLICATIONS

Sydney Sunny Glass http://www.sunnyglass.com.au/product/general-laminated-insulating-glass/ 2015.*
(Continued)

*Primary Examiner* — Lauren R Colgan

(57) ABSTRACT

This invention relates to an insulating glass (IG) window unit designed to prevent or reduce bird collisions therewith. The IG window unit includes at least first, second and third substrates (e.g., glass substrates). At least one of the substrates supports an ultraviolet (UV) reflecting coating for reflecting UV radiation so that birds are capable of more easily seeing the window, and wherein at least two of the substrates are laminated to one another via a polymer-based laminating film (e.g., of or including PVB, EVA, or SGP) that may have a high UV absoprtion. The UV reflecting coating is preferably patterned so that it is not provided across the entirety of the IG window unit. By making the window more visible to birds, bird collisions and bird deaths can be reduced. The provision of the laminated substrates in the IG window unit is particularly advantageous for bird collision windows, because it can further reduce bird collisions by providing an increased contrast ratio, improve durability, and improve processing.

15 Claims, 7 Drawing Sheets

(51) Int. Cl.
*C03C 17/36* (2006.01)
*B32B 17/10* (2006.01)
*A01M 29/08* (2011.01)
*C03C 17/34* (2006.01)
*C03C 27/10* (2006.01)
*E06B 3/67* (2006.01)

(52) U.S. Cl.
CPC .. *B32B 17/10192* (2013.01); *B32B 17/10201* (2013.01); *B32B 17/10229* (2013.01); *B32B 17/10761* (2013.01); *C03C 17/366* (2013.01); *C03C 17/3681* (2013.01); *C03C 17/3441* (2013.01); *C03C 17/3634* (2013.01); *C03C 17/3644* (2013.01); *C03C 27/10* (2013.01); *C03C 2217/74* (2013.01); *C03C 2217/78* (2013.01); *E06B 3/6715* (2013.01)

(56) References Cited

U.S. PATENT DOCUMENTS

| | | |
|---|---|---|
| 4,965,121 A | 10/1990 | Young et al. |
| 5,156,894 A | 10/1992 | Hood et al. |
| 5,306,547 A | 4/1994 | Hood et al. |
| 5,308,662 A | 5/1994 | Woodard et al. |
| 5,514,476 A | 5/1996 | Hartig et al. |
| 5,557,462 A | 9/1996 | Hartig et al. |
| 5,563,734 A | 10/1996 | Wolfe et al. |
| 5,784,853 A | 7/1998 | Hood et al. |
| 5,800,933 A | 9/1998 | Hartig et al. |
| 5,837,108 A | 11/1998 | Lingle et al. |
| 5,902,505 A | 5/1999 | Finley |
| 5,935,702 A | 8/1999 | MacQuart et al. |
| 6,014,872 A | 1/2000 | Hartig et al. |
| 6,030,671 A | 2/2000 | Yang et al. |
| 6,576,349 B2 | 6/2003 | Lingle et al. |
| 6,632,491 B1 | 10/2003 | Thomsen et al. |
| 7,153,579 B2 | 12/2006 | Kriltz et al. |
| 7,217,461 B2 | 5/2007 | Ferreira et al. |
| 7,267,879 B2 | 9/2007 | Thomsen et al. |
| 8,114,488 B2 | 2/2012 | Alvarez |
| 9,499,438 B2 | 11/2016 | Theios et al. |
| 9,650,290 B2 | 5/2017 | Vikor et al. |
| 2005/0008796 A1* | 1/2005 | Kriltz ............... B32B 17/10045 428/34 |
| 2012/0225224 A1* | 9/2012 | Blacker ............... C03C 17/3618 428/34 |
| 2012/0293862 A1 | 11/2012 | Veerasamy |
| 2012/0327499 A1 | 12/2012 | Parker et al. |
| 2014/0237917 A1* | 8/2014 | Theios ................. C03C 17/366 52/203 |
| 2015/0345206 A1* | 12/2015 | Vikor ................ C03C 17/3435 428/34 |
| 2017/0020123 A1 | 1/2017 | Arnold et al. |
| 2018/0307111 A1* | 10/2018 | Le Houx ............... G02F 1/155 |

OTHER PUBLICATIONS

U.S. Appl. No. 62/559,684, filed Sep. 18, 2017; Weng et al.
"Direct Laser Patterning of Transparent ITO-Ag-ITO Multilayer Anodes for Organic Solar Cells"; Kim et al., Applied Surface Science; vol. 327, Dec. 12, 2014, pp. 215-221.

* cited by examiner

IG WINDOW UNIT INCLUDING LAMINATED SUBSTRATES FOR PREVENTING BIRD COLLISIONS

This application claims priority on U.S. Provisional Ser. No. 62/559,684, filed Sep. 18, 2017, the entire contents of which are hereby incorporated by reference.

This invention relates to an insulating glass (IG) window unit designed to prevent or reduce bird collisions therewith. The IG window unit includes at least first, second and third substrates (e.g., glass substrates) spaced apart from one another, wherein at least one of the substrates supports an ultraviolet (UV) reflecting coating for reflecting UV radiation so that birds are capable of more easily seeing the window, and wherein at least two of the substrates are laminated to one another via a polymer-based laminating film (e.g., of or including PVB, EVA, or SGP). The UV reflecting coating is preferably patterned so that it is not provided across the entirety of the IG window unit. By making the window more visible to birds, bird collisions and bird deaths can be reduced. The provision of the laminated substrates in the IG window unit is particularly advantageous for bird collision windows, because it can further reduce bird collisions by providing an increased contrast ratio, improve durability, and improve processing.

BACKGROUND OF THE INVENTION

IG window units are known in the art. For example, see U.S. Pat. Nos. 6,632,491, 6,014,872; 5,800,933; 5,784,853; 5,557,462; 5,514,476; 5,308,662; 5,306,547; and 5,156,894, all of which are hereby incorporated herein by reference. An IG window unit typically includes at least first and second substrates spaced apart from one another by at least one spacer and/or seal. The gap or space between the spaced apart substrates may or may not be filled with a gas (e.g., argon) and/or evacuated to a pressure less than atmospheric pressure in different instances.

Many conventional IG window units include a solar management coating (e.g., multi-layer coating for reflecting at least some infrared radiation) on an interior surface of one of the two substrates. Such IG units enable significant amounts of infrared (IR) radiation to be blocked so that it does not reach the interior of the building (apartment, house, office building, or the like).

Unfortunately, bird collisions with such windows represent a significant problem. For instance, in Chicago certain buildings (e.g., skyscrapers) are located in migratory bird paths. Birds flying along these paths repeatedly run into these buildings because they cannot see the windows of the building. This results in thousands of bird deaths, especially during seasons of bird migration. Birds living in environments such as forests or park areas, with buildings located in such areas, face similar problems associated with flying into the buildings.

Conventional ways of reducing bird collisions with windows include the use of nets, decals, or frit. However, these solutions are considered ineffective because of the aesthetic impact on the architecture and/or because they do not work as they do not make the glass more visible to birds.

U.S. Pat. No. 8,114,488 discloses a window for reducing bird collisions. However, while the window of the '488 patent is effective for preventing/reducing bird collisions, there is room for improvement.

U.S. Pat. No. 9,650,290 discloses an IG window unit for reducing bird collisions, as shown for example in prior art FIG. 1. The IG window unit in FIG. 1 includes first glass substrate 1 and second glass substrate 30 that are spaced apart from one another at least by one or more peripheral seal(s) or spacer(s) 15. The spacer(s) 15, other spacer(s), and/or peripheral seal space the two substrates 1 and 30 apart from one another so that the substrates do not contact one another and so that a space or air gap 17 is defined therebetween. Air gap 17 may or may not be filled with gas such as argon. A solar management coating 19 (e.g., low-E coating) and a UV reflecting coating 150 are provided on the same glass substrate 1. However, the IG window unit of the '290 patent is made up of two glass substrates spaced apart from each other via an air gap, and there is no lamination film. Thus, the IG window unit of the '290 patent may suffer from a less than desirable contrast ratio between areas with the UV reflecting film and areas without the UV reflecting film. Thus, there is room for improvement.

In view of the above, it will be appreciated that there exists a need in the art for improved windows which can prevent or reduce bird collisions therewith.

BRIEF SUMMARY OF THE INVENTION

In certain example embodiments of this invention, a window is designed to prevent or reduce bird collisions therewith. In certain example embodiments, the window may comprise an insulating glass (IG) window unit designed to prevent or reduce bird collisions therewith. The IG window unit includes at least first, second and third substrates (e.g., glass substrates) spaced apart from one another, wherein at least one of the substrates supports an ultraviolet (UV) reflecting coating for reflecting UV radiation so that birds are capable of more easily seeing the window, and wherein at least two of the substrates are laminated to one another via a polymer-based laminating film (e.g., of or including PVB, EVA, or SGP). The UV reflecting coating is preferably patterned so that it is not provided across the entirety of the IG window unit. By making the window more visible to birds, bird collisions and bird deaths can be reduced. The provision of the laminated substrates in the IG window unit is particularly advantageous for bird collision windows, because it: (a) increases the contrast ratio of the IG window unit between areas having the UV reflecting coating and areas not having the UV reflecting coating, thereby making the window more visible to birds and reducing the likelihood of bird collisions, (b) increases mechanical durability of the IG window unit and reduces the likelihood of glass cracking due to bird collisions, and (c) in certain embodiments allows two single-coated-side glass substrates to be provided which improves production durability and processing so as to reduce likelihood of coating damage during processing, manufacturing, and/or shipping.

In an example embodiment of this invention, there is provided an IG window unit comprising: a first glass substrate; a second glass substrate; a third glass substrate; wherein the first glass substrate is provided at an exterior side of the IG window unit so as to face an exterior of a building in which the IG window unit is to be mounted; wherein the second glass substrate is provided between at least the first and third glass substrates; wherein the third glass substrate is provided at an interior side of the IG window unit so as to face an interior of a building in which the IG window unit is to be mounted; a patterned UV reflecting coating provided on the first glass substrate and on an exterior surface of the IG window unit so as to face an exterior of a building in which the IG window unit is to be mounted; wherein the first and second glass substrates are laminated to each other via a polymer inclusive laminating film; a low-E coating provided on the a side of the second glass substrate opposite the polymer inclusive laminating film, so that the second glass substrate is located between the low-E coating and the polymer inclusive laminating film; wherein the first glass substrate is located between the patterned UV reflecting coating and the polymer inclusive laminating film; wherein the UV reflecting coating is not part of a low-E coating and does not contain any IR reflecting layer of silver or gold; and wherein the second glass substrate is spaced apart from the third glass substrate via at least an air gap, so that a laminated structure including the first glass substrate, the second glass substrate, and the polymer inclusive laminating film is located on an outboard side of the air gap and on an outboard side of the low-E coating.

In an example embodiment of this invention, there is provided an IG window unit comprising: a first glass substrate; a second glass substrate; a third glass substrate; wherein the first glass substrate is provided at an exterior side of the IG window unit so as to face an exterior of a building in which the IG window unit is to be mounted; wherein the second glass substrate is provided between at least the first and third glass substrates; wherein the third glass substrate is provided at an interior side of the IG window unit so as to face an interior of a building in which the IG window unit is to be mounted; a patterned UV reflecting coating provided on the first glass substrate and on an exterior surface of the IG window unit so as to face an exterior of a building in which the IG window unit is to be mounted; wherein the second and third glass substrates are laminated to each other via a polymer inclusive laminating film; a low-E coating provided on either the second glass substrate or on a side of the first glass substrate opposite the UV reflecting coating, so that the first glass substrate is located between the low-E coating and the UV reflecting coating, and so that the second glass substrate is located between the polymer inclusive laminating film and the low-E coating; wherein the first glass substrate is spaced apart from the second glass substrate via at least an air gap, so that a laminated structure including the second glass substrate, the third glass substrate, and the polymer inclusive laminating film is located on an inboard side of the air gap and on an inboard side of the low-E coating.

DETAILED DESCRIPTION OF EXAMPLE EMBODIMENTS OF THE INVENTION

Figure 1:
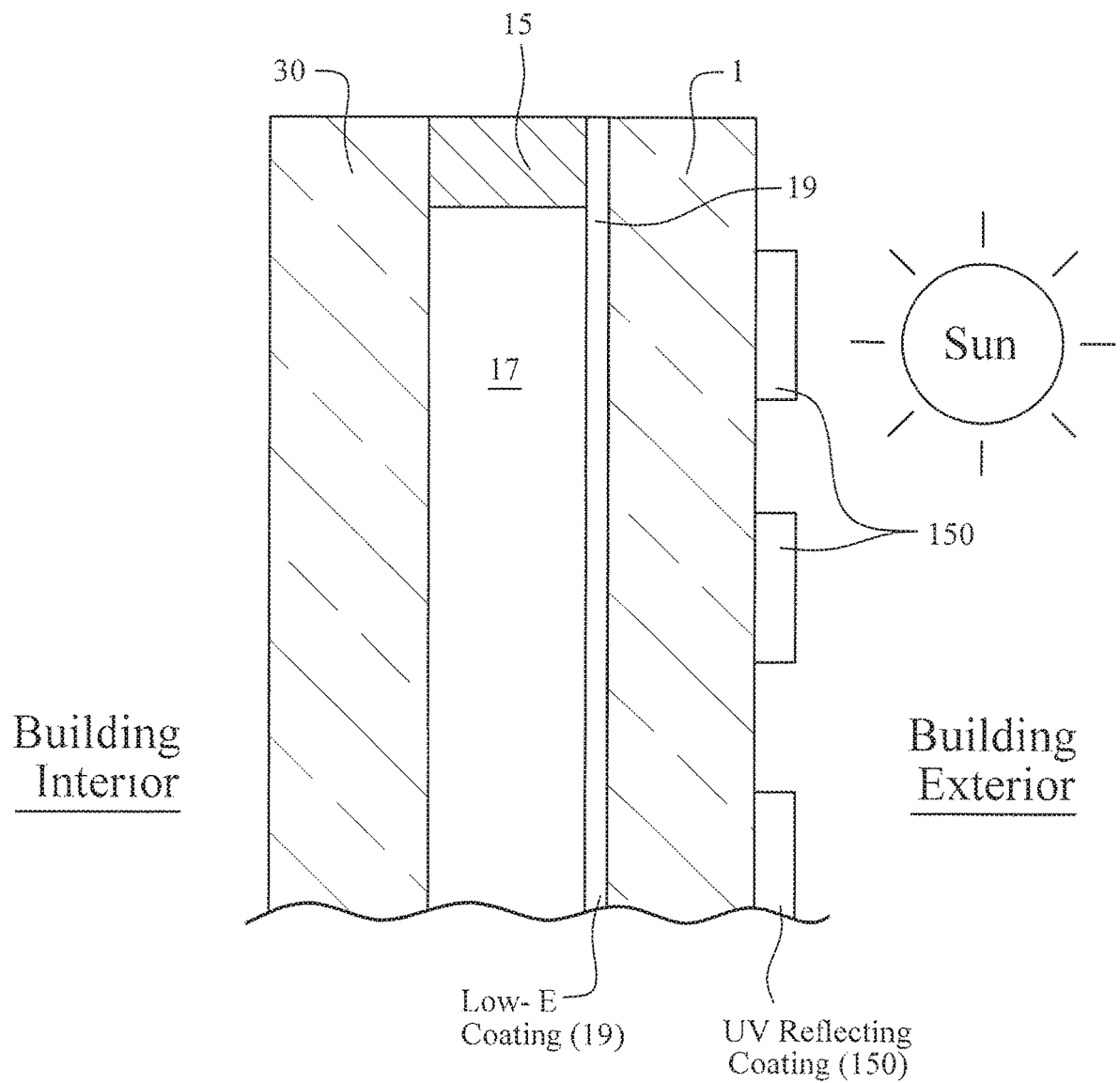
FIG. 1 is a cross sectional view of a prior art IG window unit.

Referring now more particularly to the accompanying drawings in which like reference numerals indicate like parts throughout the several views.

The difference between color vision of a bird and human is significant. A bird's visual receptor may be around 370 nm which means that birds can generally see efficiently in the UV range. Using this difference, it is possible to make a coating that efficiently reflects UV (making it visible to birds) while being substantially neutral/invisible to human eyes. Thus, the UV coating may be designed to have essentially the same or a similar reflectance characteristic as bare glass, so as to be substantially invisible to humans.

A window is designed to prevent or reduce bird collisions therewith. In certain example embodiments, the window may comprise an insulating glass (IG) window unit designed to prevent or reduce bird collisions therewith. The IG window unit includes at least first (any of 1, 30 or 31), second (another of 1, 30 or 31) and third (yet another of 1, 30 or 31) substrates (e.g., glass substrates) spaced apart from one another, wherein at least one of the substrates (e.g., substrate 1 in FIGS. 2-3) supports an ultraviolet (UV) reflecting coating 150 for reflecting UV radiation so that birds are capable of more easily seeing the window. At least two of the substrates are laminated to one another via a polymer-based laminating film (e.g., of or including PVB, EVA, or SGP) 200. The polymer-based laminating film 200 is preferably of a type that has a high absorption of UV, for example a film 200 that has a UV absorption from 350-380 nm of at least 80%, more preferably of at least 90%, and most preferably at least 95%. Note that this is not a typical feature of laminating films such as PVB, because certain PVB films for example do not have a high UV absorption (while others do). For instance, substrates 30 and 31 are laminated to each other in the FIG. 2 embodiment, and substrates 1 and 30 are laminated to each other in the FIG. 3 embodiment via laminating film 200. The UV reflecting coating 150 is preferably patterned so that it is not provided across the entirety of the IG window unit. By making the window more visible to birds, bird collisions and bird deaths can be reduced. Example embodiments of this invention provide a new IGU configuration with laminated glass to further increase the contrast ratio between areas with UV reflecting coating and areas without the UV reflecting coating. For example, PVB used in laminated glass can absorb much of UV wavelengths between 300 nm and 400 nm, thereby increasing contrast ratio between areas with UV reflecting coating 150 and areas without the UV reflecting coating 150. The provision of the laminated substrates, via laminating film 200, in the IG window unit is particularly advantageous for bird collision windows, because it: (a) increases the contrast ratio of the IG window unit between areas having the UV reflecting coating and areas not having the UV reflecting coating, thereby making the window more visible to birds and reducing the likelihood of bird collisions, (b) increases mechanical durability of the IG window unit and reduces the likelihood of glass cracking due to bird collisions, and (c) in certain embodiments allows two single-coated-side glass substrates to be provided which improves production durability and processing so as to reduce likelihood of coating damage during processing, manufacturing, and/or shipping.

Figure 2:
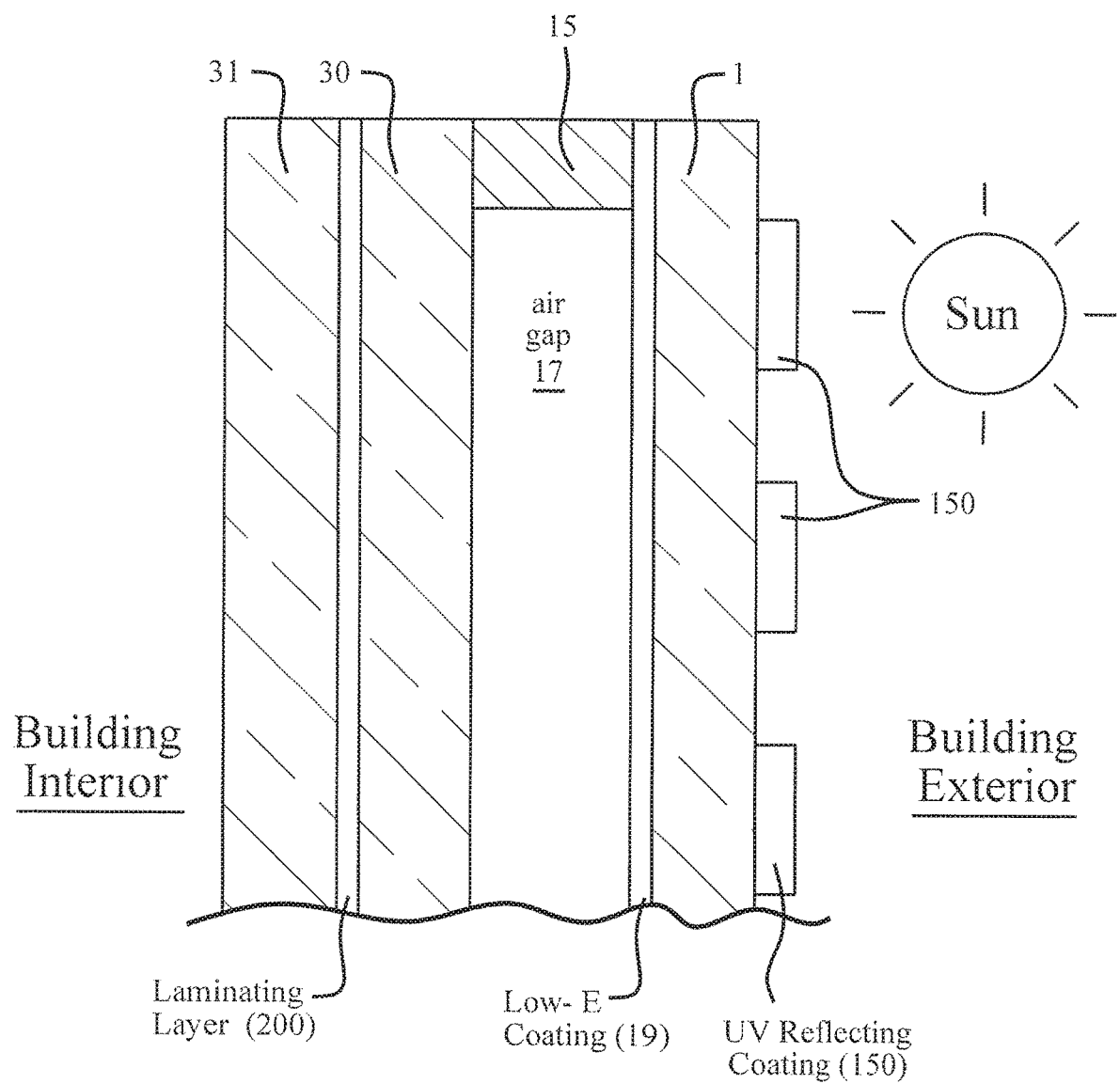
FIG. 2 is a cross sectional view of an IG window unit according to an example embodiment of this invention.
Figure 3:
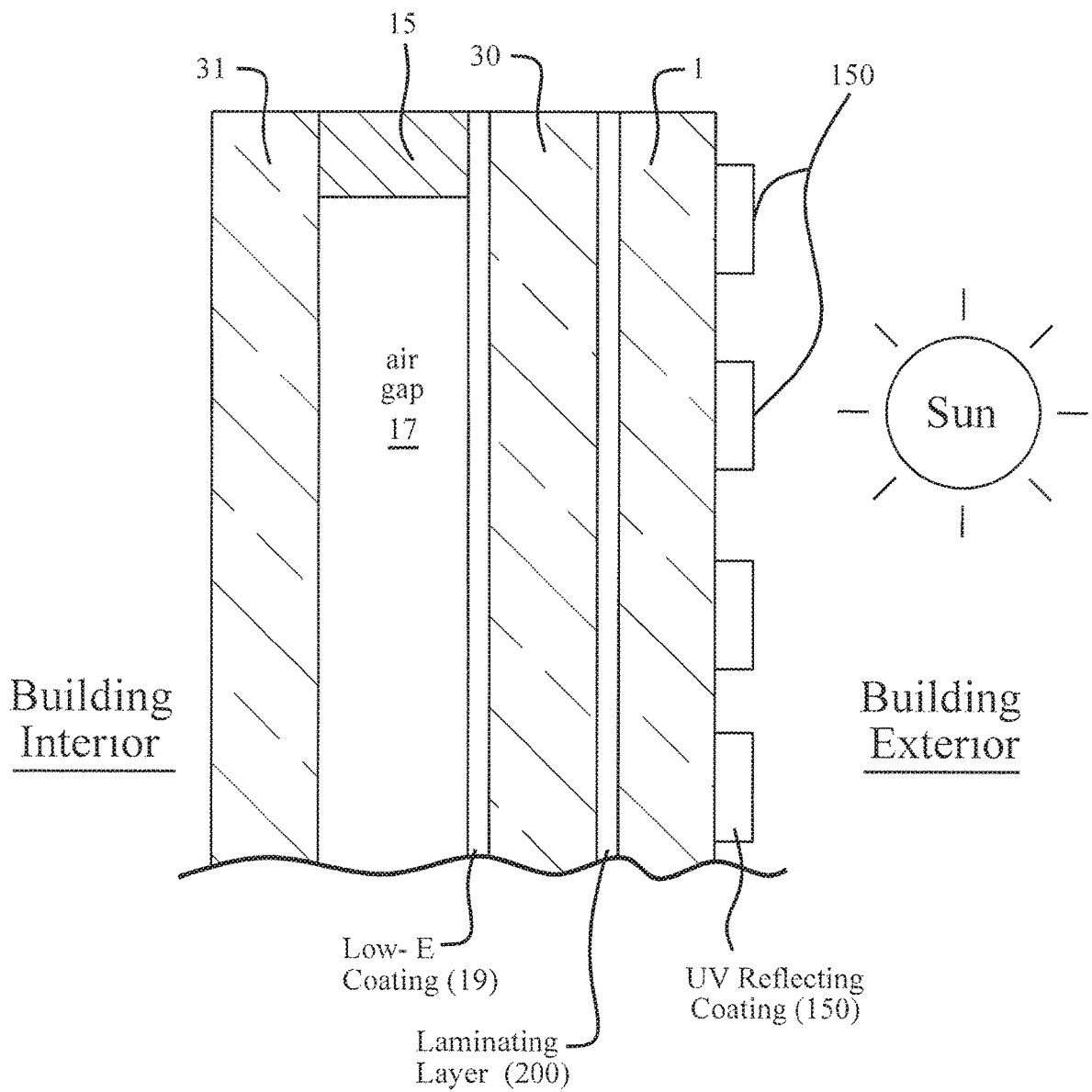
FIG. 3 is a cross sectional view of an IG window unit according to another example embodiment of this invention.

Referring to FIGS. 2-3 for example, a pair of spaced apart substrates may be separated from one another by at least one seal and/or spacer 15 in certain example embodiment. In certain example embodiments, there is provided a solar management coating (e.g., low-E coating) 19 for blocking at least some infrared (IR) radiation and a UV reflecting blocking coating 150 for reflecting UV radiation to make the window more visible to birds in order to reduce collisions. In certain example embodiments, the low-E coating 19 may have an emissivity ($E_n$) of no greater than 0.10 and/or a sheet resistance ($R_s$) of no greater than 8 ohms/square. In certain example embodiments, the UV reflecting coating 19 may block at least 38% (more preferably at least 40%, more preferably at least 55%, even more preferably at least 60%, and possibly at least 65%) of UV radiation in at least a substantial part of the range from 350 to 440 nm (or alternatively in a substantial part of the range from 300-400 nm). This is significant UV blockage/reflection, and represents a significant advantage over coatings described in U.S. Pat. No. 8,114,488 for example and without limitation. This increases the UV reflection of the window unit intended for commercial or residential applications in order to make such windows more visible to birds thereby preventing or reducing bird collisions. The use of such coatings herein enhances the performance of the glass or window by increasing the UV reflectance beyond the normal limits of raw uncoated plate glass in the 300-440 nm range of the spectrum. In certain example embodiments, the UV reflecting/blocking coating 150 is patterned (e.g., in a grid pattern or in a parallel striped pattern) on the window unit which can make it even more visible to birds to further reduce bird collisions. The IG window unit preferably has a visible transmission of at least about 50%, more preferably of at least about 60%, and even more preferably of at least about 65% or at least about 70%. Monolithic coated articles having only the coating 150 on a glass substrate 1 (e.g., see FIG. 3) may have: (a) a visible transmission of at least about 70%, more preferably of at least about 80%, and even more preferably of at least about 85%, (b) the film side UV reflectance of at least 38% (more preferably at least 40%, more preferably at least 55%, even more preferably at least 60%, and possibly at least 65%), and (c) a film side visible reflectance of less than about 20%, more preferably less than about 15%, and most preferably less than about 10%. Thus, the film side UV reflectance may be at least about 4 times higher than the film side visible reflectance of the monolithic coated article (more preferably at least about 5 times higher, even more preferably at least about 8 times higher, and possibly at least 10 times higher).

FIGS. 2-3 are cross sectional views of a portion of an IG window unit according to example embodiments of this invention. The IG window unit includes glass substrate 1, glass substrate 30, and glass substrate 31. In the FIG. 2 embodiment, glass substrate 1 and glass substrate 30 are spaced apart from one another at least by one or more peripheral seal(s) or spacer(s) 15, so as to define an air gap 17 therebetween. The UV reflecting coating 150 is provided on the outboard side of glass substrate 1, and the low-E coating 19 is provided on the inboard side of substrate 1. The air gap may or may not be filled with a gas such as argon gas. Optionally, an array of spacers (not shown) may be provided between the substrates 1 and 30 in FIG. 2 in a viewing area of the window for spacing the substrates from one another as in the context of a vacuum IG window unit. The spacer(s) 15, other spacer(s), and/or peripheral seal space the two substrates 1 and 30 in FIG. 2 apart from one another so that the substrates do not contact one another and so that a space or gap 17 is defined therebetween. The space 17 between the substrates 1, 30 may be evacuated to a pressure lower than atmospheric in certain example embodiments, and/or may be filled with a gas (e.g., Ar) in certain example embodiments. In certain example embodiments, it is possible to suspend foil or other radiation reflective sheet(s) (not shown) in space 17. Glass substrates 30 and 31 are laminated to each other via laminating film 200, on the inboard side (side to be closest to the building interior) of the air gap 17 in the FIG. 2 embodiment. The polymer based laminating film 17 preferably absorbs UV, and may be of or include PVB (polyvinyl butyral), EVA, SGP (Sentry Glass Plus), or the like in different example embodiments of this invention. When substrate(s) 1, 30 and 31 are of glass, each glass substrate may be of the soda-lime-silica type of glass, or any other suitable type of glass, and may be for example from about 1 to 10 mm thick in certain example embodiments of this invention.

Similarly, in the FIG. 3 embodiment, glass substrate 30 and glass substrate 31 are spaced apart from one another at least by one or more peripheral seal(s) or spacer(s) 15, so as to define an air gap 17 therebetween. The UV reflecting coating 150 is provided on the outboard side of glass substrate 1 closest to the building exterior, and the low-E coating 19 is provided on the inboard side of substrate 30. The air gap 17 may or may not be filled with a gas such as argon gas. Optionally, an array of spacers (not shown) may be provided between the substrates 30 and 31 in FIG. 3 in a viewing area of the window for spacing the substrates from one another as in the context of a vacuum IG window unit. The spacer(s) 15, other spacer(s), and/or peripheral seal space the two substrates 30 and 31 in FIG. 3 apart from one another so that the substrates do not contact one another and so that a space or gap 17 is defined therebetween. The space 17 between the substrates 31, 30 may be evacuated to a pressure lower than atmospheric in certain example embodiments, and/or may be filled with a gas (e.g., Ar) in certain example embodiments. In certain example embodiments, it is possible to suspend foil or other radiation reflective sheet(s) (not shown) in space 17. In the FIG. 3 embodiment, glass substrates 1 and 30 are laminated to each other via polymer based laminating film 200, on the outboard side (side to be closest to the building exterior) of the air gap 17. The polymer based laminating film 17 preferably absorbs UV, and may be of or include PVB, EVA, SGP, or the like. Thus, FIGS. 2 and 3 differ from each other mainly in that (i) the laminated structure is provided on the inboard side of the air gap 17 and on the inboard side of the low-E coating 19 in FIG. 2, but is provided on the outboard side of the air gap 17 and low-E coating 19 in FIG. 3, and (ii) FIG. 3 provides for a structure allowing two single-coated-side glass substrates 1 and 30 to be provided which improves production durability and processing so as to reduce likelihood of coating damage during processing, manufacturing, and/or shipping. With respect to point (ii), in FIG. 3 glass substrate 1 is only coated on one side with UV coating 150, and glass substrate 30 is only coated on one side with low-E coating 19, in the manufacturing process (laminating film 200 is an interlayer for laminating/adhering purposes and is not a film that is sputter-deposited or otherwise deposited onto a surface of a substrate). In contrast, the FIG. 2 embodiment requires that both sides of glass substrate 1 be coated, one side with the UV coating 150 and the other side with the low-E coating, which can increase risk of damage during processing, shipping, and/or handling.

The IG window units of FIGS. 2-3 may include a solar management coating 19 (e.g., low-E coating) that is supported on an inboard side of glass substrate 1 (FIG. 2) or on an inboard side of glass substrate 30 (FIG. 3). Low-E coating 19 includes one or more layers, although in many embodiments it is a multi-layer coating. Low-E coating 19 includes at least one IR reflecting layer (e.g., based on silver or gold) sandwiched between at least first and second dielectric layers. Since one example function of low-E coating 19 is to block (i.e., reflect and/or absorb) certain amounts of IR radiation and prevent the same from reaching the building interior, the solar management coating 9 includes at least one IR blocking (i.e., IR reflecting and/or absorbing) layer. Example IR blocking layer(s) which may be present in coating 19 are of or include silver (Ag), nickel-chrome (NiCr), gold (Au), and/or any other suitable material that blocks significant amounts of IR radiation. It will be appreciated by those skilled in the art that IR blocking layer(s) of low-E coating 19 need not block all IR radiation, but only need to block significant amounts thereof. In certain embodiments, each IR blocking layer of coating 19 is provided between at least a pair of dielectric layers. Example dielectric layers include silicon nitride, titanium oxide, silicon oxynitride, tin oxide, and/or other types of metal-oxides and/or metal-nitrides. In certain embodiments, in addition to being between a pair of dielectric layers, each IR blocking layer may also be provided between a pair of contact layers of or including a material such as an oxide and/or nitride of nickel-chrome or any other suitable material. Example low-E coatings 19 are described in U.S. Pat. Nos. 7,267,879, 6,576,349, 7,217,461, 7,153,579, 5,800,933, 5,837,108, 5,557,462, 6,014,872, 5,514,476, 5,935,702, 4,965,121, 5,563,734, 6,030,671, 4,898,790, 5,902,505, 3,682,528, all of which are hereby incorporated herein by reference. In certain example embodiments, before and/or after optional heat treatment (e.g., thermal tempering and/or heat bending), the low-E coating 19 may have a sheet resistance ($R_s$) of no greater than 8 ohms/square, more preferably no greater than 6 ohms/square, and most preferably no greater than 4 ohms/square. In certain embodiments, the low-E coating 19 may have an emissivity ($E_n$) after heat treatment of no greater than 0.10, more preferably no greater than 0.07, and even more preferably no greater than 0.05 (before and/or after optional heat treatment). Of course, solar management coatings 19 herein are not limited to these particular coatings, and any other suitable solar management coatings capable of blocking amounts of IR radiation may instead be used. Solar management coatings 19 herein may be deposited on substrate(s) 1 and/or 30 in any suitable manner, including but not limited to sputtering, vapor deposition, and/or any other suitable technique.

Still referring to FIGS. 2-3, the IG window units further include UV reflecting coating 150 for reflecting significant amounts of UV radiation thereby making the window more visible to birds. Coatings 150 may be sputter-deposited in example embodiments of this invention. UV reflecting coating 150 may be, for purposes of example and without limitation, any of the UV reflecting coatings illustrated in FIGS. 7-11. This increases the UV reflection of the window unit in order to make such windows more visible to birds thereby preventing or reducing bird collisions. The use of such coatings 150 herein enhances the performance of the glass or window by increasing the UV reflectance beyond the normal limits of raw uncoated plate glass in the 300-440 nm range of the spectrum. In certain example embodiments, the UV reflecting coating 150 is in direct contact with the glass substrate 1 on the exterior surface thereof, and is not part of a low-E coating 19. In particular, there are no IR reflecting layers (e.g., silver based, gold based, NiCr, or IR reflecting TCO-based layers) in coating 150, and there are no IR reflecting layers on the side of the substrate 1 on which the coating 150 is provided. Instead, any low-E coatings (e.g., see low-E coating 19) may be provided on the other side of substrate 1 from coating 150 or alternatively on substrate 30. In certain example embodiments, the UV reflecting coating 150 may block at least 38% (more preferably at least 40%, more preferably at least 55%, even more preferably at least 60%, and possibly at least 65%) of UV radiation in at least a substantial part of the range from 350 to 440 nm (or alternatively in a substantial part of the range from 300-400 nm).

The UV reflecting coating 150 may be patterned (e.g., in the shape of a grid or in substantially parallel or non-parallel stripes) on the surface of substrate 1 as shown in FIGS. 2-3, or alternatively may be provided continuously across substantially the entire surface of substrate 1 in other embodiments. The patterned shape of coating 150 may be formed as follows, for purposes of example. A pattern (not shown) is provided on the surface of substrate 1 prior to the coating 150 being formed, with the pattern being located in areas which are ultimately to be free of coating 150. After the pattern is formed, a coating 150 is continuously formed across the entire or substantially the entire surface of substrate 1 over the pattern. The pattern can then be removed (along with the portions of coating 150 located directly over it) in order to create a patterned coating 150, so that the coating 150 remains on only the portions of the substrate where the original pattern was not deposited. Thus, a patterned coating 150 can be formed in such a manner in example embodiments of this invention. The remaining patterned coating 150 is substantially invisible to human eyes, but is visible to bird eyes as explained above.

In certain example embodiments of this invention, the window unit (e.g., insulating glass (IG) window unit and/or laminated window unit) is designed to prevent or reduce bird collisions therewith. The IG window unit may include two or three substrates (e.g., glass substrates) spaced apart from one another, and at least one of the substrates supports an ultraviolet (UV) reflecting coating for reflecting UV radiation. The UV reflecting coating may be a low-E coating including at least one infrared (IR) reflecting layer (e.g., silver based) provided between at least first and second dielectric layers, or alternatively may be a coating designed without any IR reflecting layer(s) of silver, gold or the like. The UV reflecting coating 150 may be patterned by a laser (e.g., femto laser) which is used to either entirely or partially remove (e.g., via laser ablation) a portion of the coating in a pattern, so that after patterning by the laser the patterned coating is either not provided across the entirety of the window unit and/or is non-uniform in UV reflection across the window unit so that the UV reflection differs across different areas of the window thereby making the window unit more visible to birds which can see UV radiation and detect that pattern. Thus, in certain example embodiments, the as-deposited UV reflecting coating entirely remains on the substrate in areas not patterned by the laser, and partially remains in areas patterned by the laser. Femto lasers have been found to be advantageous in that they can efficiently pattern such UV reflecting coatings 150 without damaging the underlying glass substrate, and can more easily be used to remove only part of such a coating in patterned areas so as to maintain substantially the same surface energy in both patterned and non-patterned areas of the UV reflective coating. Surprisingly and unexpectedly, it has also been found that the user of the Femto lasers result in a final product with less haze that if a non-Femto laser has been used. In preferred example embodiments of this invention, the final coated article, including both patterned and non-patterned areas, has a haze value of no greater than 0.4, more preferably no greater than 0.3, and most preferably no greater than 0.2. Less haze is more aesthetically pleasing to humans, and by making the window more visible to birds, bird collisions and bird deaths can be reduced. Surprisingly, and unexpectedly, it has also been found that during patterning a laser fluence of from 0.01 to 2 $J/cm^2$, and most preferably 0.05 to 1 $J/cm^2$, advantageous results in a smoother ablation of the patterned areas and allows the ablation to occur with partial coating removal but without any significant damage to the glass substrate and without significant haze in the patterned areas. The patterned UV reflecting coating 150 is preferably substantially neutral in the visible range, so that the patterning of the UV coating is not reasonably seen by humans via the naked eye. Another advantage of laser is that we can do random patterning on the fly. In an example embodiment of this invention, there is provided a method of making a window for reducing bird collisions, the window comprising a first glass substrate and a ultraviolet (UV) reflective coating supported by at least the first glass substrate, the method comprising: having the first glass substrate and the ultraviolet (UV) reflective coating supported by at least the first glass substrate; emitting a laser beam from at least one laser source, the laser beam comprising optical pulses with (i) a duration below 1000 Femtoseconds and/or (ii) a fluence from 0.01 to 2.0 $J/cm^2$; wherein the laser beam comprising optical pulses is incident upon the UV reflective coating and patterns the UV reflective coating into patterned and non-patterned areas which have different respective UV reflectances, the laser beam having been incident upon the patterned areas but not the non-patterned areas. The laser beam may comprise optical pulses with a duration below 100 Femtoseconds, and possibly a duration below 50 Femtoseconds. All layers of the UV reflective coating may be dielectric layers, or alternatively the UV reflective coating may be a low-E coating having at least one IR reflective layer sandwiched between at least first and second dielectric layers.

Figure 4:
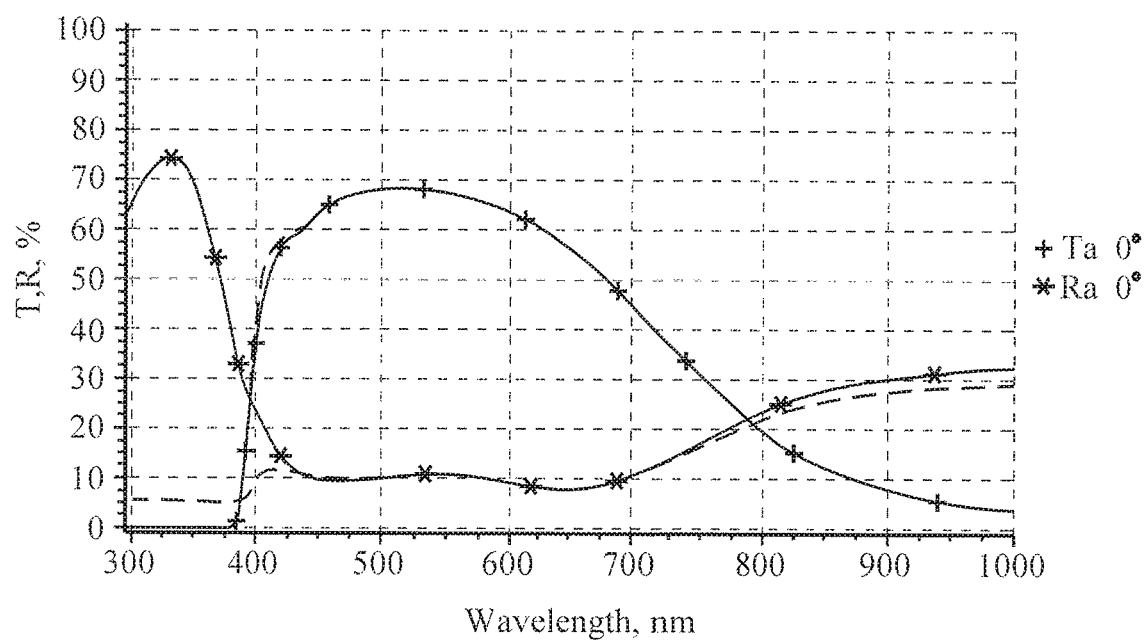
FIG. 4 is a wavelength (nm) versus Transmission (T) % and Reflection (R) %, showing transmission and reflection as a function of wavelength (nm) for an example IG window unit of the FIG. 3 embodiment of this invention where the laminated glass substrates are on the outboard side (closest to the exterior of the building on which the window is to be provided) of the air gap, where broken lines are spectral curves in an area without the UV reflecting coating and solid lines are spectral curves in an area with the UV reflecting coating, and assuming for purposes of example 6 mm thick glass substrates, a 12 mm thick air gap, and about 0.76 mm thick PVB laminating film.
Figure 5:
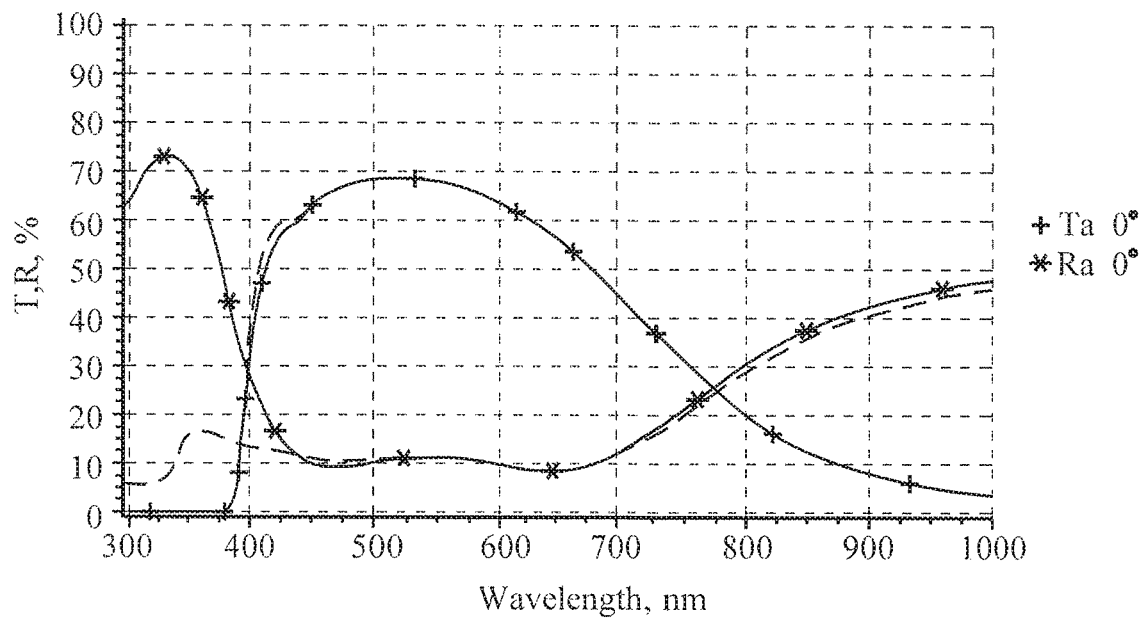
FIG. 5 is a wavelength (nm) versus Transmission (T) % and Reflection (R) %, showing transmission and reflection as a function of wavelength (nm) for an example IG window unit of the FIG. 2 embodiment of this invention where the laminated glass substrates are on the inboard side (closest to the interior of the building on which the window is to be provided) of the air gap, where broken lines are spectral curves in an area without the UV reflecting coating and solid lines are spectral curves in an area with the UV reflecting coating, and assuming for purposes of example 6 mm thick glass substrates, a 12 mm thick air gap, and about 0.76 mm thick PVB laminating film.
Figure 6:
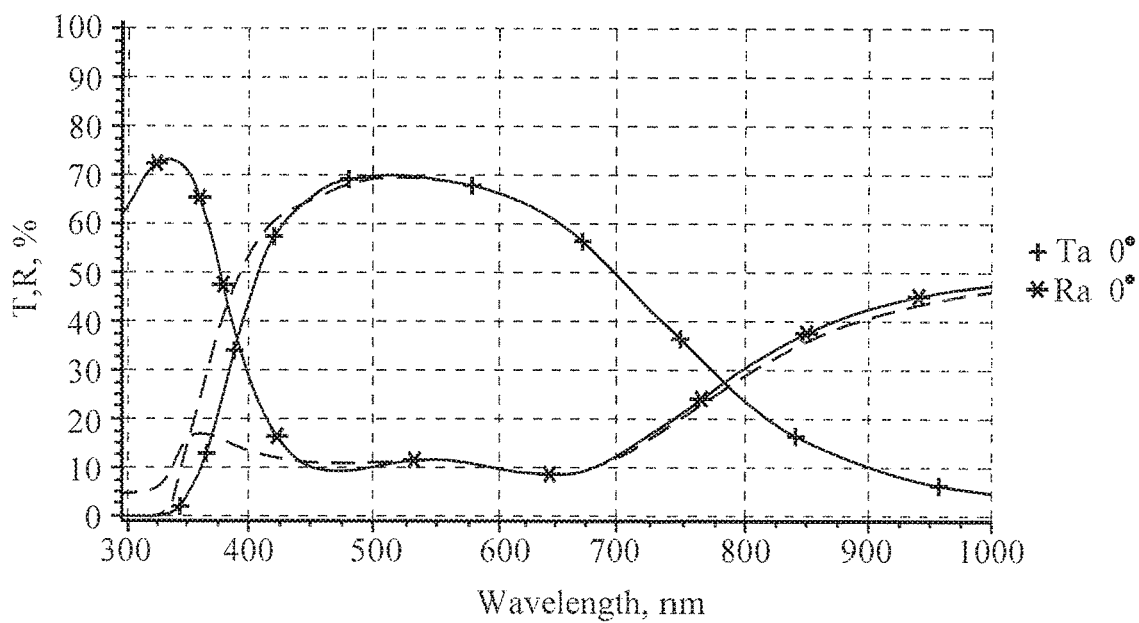
FIG. 6 is a wavelength (nm) versus Transmission (T) % and Reflection (R) %, showing transmission and reflection as a function of wavelength (nm) for an example IG window unit of prior art FIG. 1 having no laminated glass substrates, where broken lines are spectral curves in an area without the UV reflecting coating and solid lines are spectral curves in an area with the UV reflecting coating, and assuming for purposes of example 6 mm thick glass substrates, and a 12 mm thick air gap.

FIGS. 4-6 demonstrate surprising technical advantages associated with the IG window units of FIGS. 2-3 compared to that of FIG. 1, and also demonstrate surprising technical advantages of the FIG. 3 embodiment (outboard laminated structure) compared to the FIG. 2 embodiment (inboard laminated structure). FIG. 4 is a wavelength (nm) versus Transmission (T) % and Reflection (R) %, showing transmission and reflection as a function of wavelength (nm) for an example IG window unit of the FIG. 3 embodiment of this invention where the laminated glass substrates are on the outboard side (closest to the exterior of the building on which the window is to be provided) of the air gap, where broken lines are spectral curves in an area without the UV reflecting coating and solid lines are spectral curves in an area with the UV reflecting coating, and assuming for purposes of example 6 mm thick glass substrates, a 12 mm thick air gap, and about 0.76 mm thick PVB laminating film. In a similar manner, FIG. 5 is a wavelength (nm) versus Transmission (T) % and Reflection (R) %, showing transmission and reflection as a function of wavelength (nm) for an example IG window unit of the FIG. 2 embodiment of this invention where the laminated glass substrates are on the inboard side (closest to the interior of the building on which the window is to be provided) of the air gap, where broken lines are spectral curves in an area without the UV reflecting coating and solid lines are spectral curves in an area with the UV reflecting coating, and assuming for purposes of example 6 mm thick glass substrates, a 12 mm thick air gap, and about 0.76 mm thick PVB laminating film. For purposes of comparison, FIG. 6 is a wavelength (nm) versus Transmission (T) % and Reflection (R) %, showing transmission and reflection as a function of wavelength (nm) for an example IG window unit of prior art FIG. 1 having no laminated glass substrates, where broken lines are spectral curves in an area without the UV reflecting coating and solid lines are spectral curves in an area with the UV reflecting coating, and assuming for purposes of example 6 mm thick glass substrates, and a 12 mm thick air gap. The same low-E coating is assumed in each of FIGS. 4-6, and the same UV reflecting coating is assumed in each of FIGS. 4-5. Thus, FIG. 4 corresponds to an example of the FIG. 3 embodiment, FIG. 5 corresponds to an example of the FIG. 2 embodiment, and FIG. 6 corresponds to prior art FIG. 1.

It can be seen that in FIGS. 4-5 the solid transmission curve (Ta) remains flat in the UV region for much longer than in FIG. 6. In particular, in FIG. 6 the transmission curve begins increasing around 335 nm, whereas in FIGS. 4-5 the transmission curve does not begin increasing until after 380 nm, thereby demonstrating that the laminated structures in FIGS. 2-3 suppress transmission in the UV region from 300-400 nm much better than does the prior art FIG. 1 structure that has no laminated structure. It is possible that this may be due to the presence of the laminating film 200 that absorbs UV radiation.

Thus, as shown in FIGS. 4-6, in the transmission mode, lamination (when laminating film 200 is present laminating together a pair of substrates) reduces UV transmission for both areas with and without UV reflecting coating, thereby enhancing the transmissive contrast ratio CR(TR), which is defined as the ratio of transmittance without UV coating to that with UV coating.

$$CR(TR) = \frac{TR_{wo\_UV}}{TR_{w\_UV}}$$

The contrast ratio has been found to be higher for the laminated IGUs of FIGS. 2-3 around 365-369 nm (compared to FIG. 1). The transmission curves for inboard laminated structure and outboard laminated structures are nearly identical, so the improvement is essentially the same in the transmission mode for the FIGS. 2 and 3 embodiments.

On the other hand, the FIG. 3 IG unit with the outboard laminated structure has been found to realize improved performance features compared to both the FIG. 1 and FIG. 2 IG units. This is because FIG. 3 has a laminated structure (compared to FIG. 1) and because FIG. 3 has the laminated structure on the outboard side of the air gap and low-E coating (compared to FIG. 2). FIGS. 4-6 illustrate that the IG units of FIGS. 1-3 have very different reflection curves in UV spectra. In the case of outboard laminated structure of FIG. 3, UV light from the sun is mostly absorbed by PVB 200 before it reaches the low-E coating 19. But in the case of inboard laminated structure of FIG. 2, a certain portion of UV light reaches and is reflected by the low-E coating 19; this amount of extra UV reflection reduces the reflective contrast ratio CR(RF) which is defined as the ratio of reflectance in areas with UV coating 150 to areas without UV coating 150.

$$CR(RF) = \frac{RF_{w\_UV}}{RF_{wo\_UV}}$$

Thus, due to providing the laminated structure on the outboard side of the air gap 17 and on the outboard side of the low-E coating 19, the reflective contrast ratio of the IG unit has surprisingly been found to be significantly higher for the FIG. 3 embodiment of this invention, compared to the FIG. 2 embodiment of this invention, and thus the FIG. 3 IG window unit will be more visible to birds and thus realize less bird collisions than both FIG. 1 and the FIG. 2 embodiment.

FIGS. 7-11 are cross sectional views of various UV reflecting coatings 150 that may be used on substrate 1 in the IG window unit of FIG. 1 or FIG. 2 in example embodiments of this invention. Glass substrate 1 may be soda-lime-silica based glass or any other suitable type of glass, and may be from about 1-10 mm thick, more preferably from about 2-6 mm thick, in example embodiments of this invention.

Figure 7:
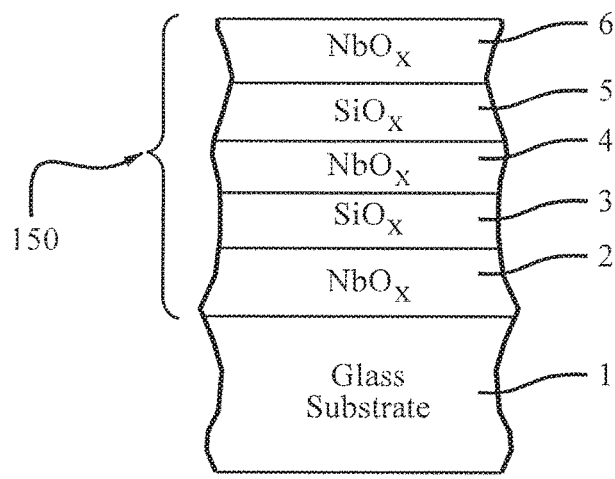
FIG. 7 is cross sectional view of a UV reflecting coating on a glass substrate, which may be used in the IG window unit of any of FIGS. 2-3 according to example embodiments of this invention.

In the FIG. 7 embodiment, UV reflecting coating 150 includes high index transparent dielectric layers 2, 4 and 6 of or including niobium oxide (e.g., $Nb_2O_5$, $NbO_2$ and/or $NbO$) and low index transparent dielectric layers 3 and 5 of or including silicon oxide (e.g., $SiO_2$ which may or may not be doped with aluminum and/or nitrogen). Note that layer 6 in FIG. 7 is optional and can be removed to improve UV reflectance in certain instances, or can instead be of or including zirconium oxide. In certain example embodiments, one or both of the silicon oxide layers 3 and/or 5 may be doped with other material such as from about 1-8% aluminum and/or from about 1-10% nitrogen. One or more of layers 2, 4 and 6 may also be doped with other material in certain example instances. In the FIG. 7 embodiment, layer 6 is the outermost layer of the coating 150 and may be exposed to air. Each of layers 2-6 is considered "transparent" to visible light because each of these layers, standing alone, is substantially transparent to visible light (e.g., at least about 50% transparent, more preferably at least about 60% or 70% transparent to visible light). High index transparent dielectric layers 2, 4 and 6 of or including niobium oxide may have a refractive index (n) of from about 2.15 to 2.5, more preferably from about 2.2 to 2.4, and most preferably from about 2.25 to 2.35 (at 550 nm). In certain alternative embodiments, the niobium oxide may be replaced with titanium oxide (e.g., $TiO_2$), zirconium oxide, hafnium oxide (e.g., $HfO_2$), cerium oxide (e.g., $CeO_2$), zinc sulfide, or bismuth oxide (e.g., $Bi_2O_3$) in one or more of high index layers 2, 4 and/or 6. Thus, in one such example, layer 6 may be of or including titanium oxide, while layers 2 and 4 are of or including niobium oxide, and layers 3 and 5 are of or including silicon oxide. Low index transparent dielectric layers 3 and 5 of or including silicon oxide may have a refractive index (n) of from about 1.4 to 1.7, more preferably from about 1.4 to 1.6, and most preferably from about 1.45 to 1.55 (all refractive index n values herein are measured at 550 nm). Transparent dielectric layers 2-6 are preferably deposited by sputtering in example embodiments of this invention. For example, transparent dielectric layers 2, 4 and 6 of or including niobium oxide may be sputter deposited via at least one sputtering target of or including Nb, via sputtering in an atmosphere including a mixture of argon and reactive oxygen gases. And for example, transparent dielectric layers 3 and 5 of or including silicon oxide may be sputter deposited via at least one sputtering target of or including Si or SiAl, via sputtering in an atmosphere including a mixture of argon and reactive oxygen gases. Rotation C-Mag sputtering targets, or other types of targets, may be used. In sputtering operations, sufficient reactive oxygen gas may be used to achieve the refractive index values discussed herein. Ceramic targets may alternatively be used to sputter deposit one or more of these layers. While layers 2-6 are preferably deposited via sputtering, it is possible that they may be deposited via other techniques in alternative embodiments of this invention. While coating 150 consists of five layers in the FIG. 7 embodiment, it is possible that additional layers may be provided in alternative embodiments. For example, a protective layer of or including zirconium oxide (not shown) may be provided in the coating 150 as the uppermost layer over and directly contacting layer 6. Coating 150 in the FIG. 7 embodiment and in other example embodiments contains no metallic reflective layer.

Figure 8:
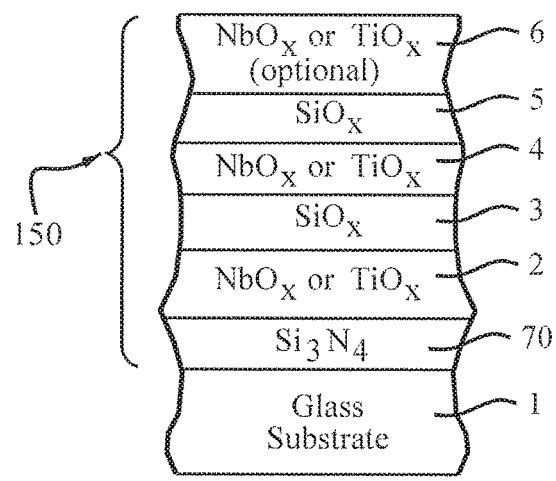
FIG. 8 is cross sectional view of another UV reflecting coating on a glass substrate, which may be used in the IG window unit of any of FIGS. 2-3 according to example embodiments of this invention.

FIG. 8 is a cross sectional view of another UV reflecting coating 150 that may be used on substrate 1 in the FIG. 2 or FIG. 3 IG window unit. The FIG. 8 embodiment is the same as the FIG. 7 embodiment, except that transparent dielectric barrier layer 70 is provided between the glass substrate 1 and high index layer 2. Note that layer 6 in FIG. 8 is optional and can be removed to improve UV reflectance in certain instances, or can instead be of or including zirconium oxide. The barrier layer 70 is of or including silicon nitride (e.g., $Si_3N_4$) in certain example embodiments of this invention. Barrier layer 70 may optionally be used in the coatings of any of FIGS. 7-11, but is only shown in FIG. 8 for purposes of simplicity. In certain example embodiments, silicon nitride based barrier layer 70 may be doped with other material such as from about 1-8% aluminum and/or from about 1-10% oxygen. The FIG. 8 embodiment is particular useful in heat treated (e.g., thermally tempered) embodiments, where the barrier layer 70 helps prevent or reduce migration of elements (e.g., Na) from the glass substrate into the coating during the high temperature heat treatment. Such heat treatment (e.g., thermal tempering) may include, for example heating the coated article in an oven or the like at temperature(s) of at least about 580 degrees C., more preferably of at least about 600 degrees C. The coating of the FIG. 8 embodiment may or may not be heat treated (e.g., thermally tempered) in example embodiments of this invention.

Figure 9:
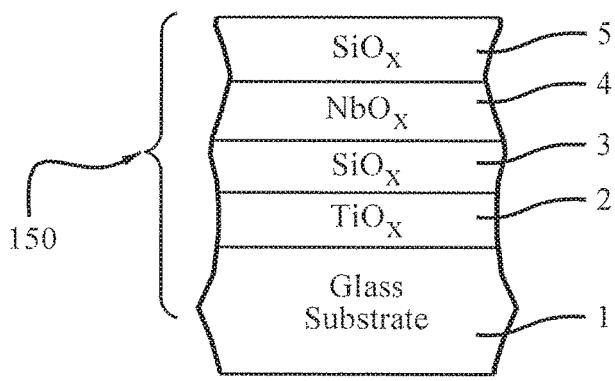
FIG. 9 is cross sectional view of another UV reflecting coating on a glass substrate, which may be used in the IG window unit of any of FIGS. 2-3 according to example embodiments of this invention.

FIG. 9 is a cross sectional view of another UV reflecting coating 150 that may be used on substrate 1 in the FIG. 2 or FIG. 3 IG window unit. The FIG. 9 embodiment is the same as the FIG. 7 embodiment, except that layer 6 is removed. The coated article shown in FIG. 9 may have, for example, a film side UV reflectance of from about 40-45%, with an example being about 41% (reflecting at least this much UV radiation in at least a substantial part of the range from 300-400 nm). In an example of the FIG. 9 embodiment, layer 5 is the outermost layer of UV reflecting coating 150, and layer 2 is of or including titanium oxide (e.g., $TiO_2$), layer 3 is of or including silicon oxide (e.g., $SiO_2$ which may or may not be doped with aluminum and/or nitrogen), layer 4 is of or including niobium oxide (e.g., $Nb_2O_5$, $NbO_2$ and/or NbO), and layer 5 is of or including silicon oxide (e.g., $SiO_2$ which may or may not be doped with aluminum and/or nitrogen). Optionally, the coating of the FIG. 9 embodiment may also include an overcoat of or including zirconium oxide (e.g., $ZrO_2$). In certain example embodiments of the FIG. 9 embodiment of this invention: (i) transparent dielectric layer 2 of or including titanium oxide may be from about 5-40 nm thick, more preferably from about 10-25 nm thick, even more preferably from about 10-20 nm thick, with an example thickness being from about 13-16 nm; (ii) transparent dielectric layer 3 of or including silicon oxide may be from about 30-100 nm thick, more preferably from about 40-80 nm thick, even more preferably from about 50-70 nm thick, with an example thickness being about 60 nm; (iii) transparent dielectric layer 4 of or including niobium oxide may be from about 15-150 nm thick, more preferably from about 20-125 nm thick, even more preferably from about 95-120 nm thick, with an example thickness being about 33 nm or about 105 nm; (iv) transparent dielectric layer 5 of or including silicon oxide may be from about 40-130 nm thick, more preferably from about 50-110 nm thick, even more preferably from about 60-100 nm thick, with example thickness being about 60 nm or about 90 nm; and (v) optional transparent overcoat protective dielectric layer 8 of or including zirconium oxide may be from about 5-60 nm thick, more preferably from about 5-30 nm thick, even more preferably from about 5-20 nm thick, with an example thickness being about 10 nm. To realize the desired UV reflectance and visible transmission values herein, niobium oxide based layer 4 is preferably substantially thicker than titanium oxide based layer 2. For example, in certain example embodiments, niobium oxide based layer 4 is at least about 40 nm thicker (more preferably at least about 50 nm thicker, and most preferably at least about 70 nm thicker) than titanium oxide based layer 2. Moreover, niobium oxide based layer 4 is also preferably thicker than each of layers 3 and 5, for example layer 4 being at least about 10 nm thicker and most preferably at least about 15 nm thicker than each of silicon oxide based layers 3 and 5. Silicon oxide based layer 5 is at least about 10 or 20 nm than is silicon oxide based layer 3 in certain embodiments of the FIG. 2, 3, 9 embodiment of this invention. Optionally, a protective layer (not shown) of or including zirconium oxide may be provided as the outermost layer over layer 5 in the FIG. 9 coating (similar to the protective outer layer in FIG. 10).

Figure 10:
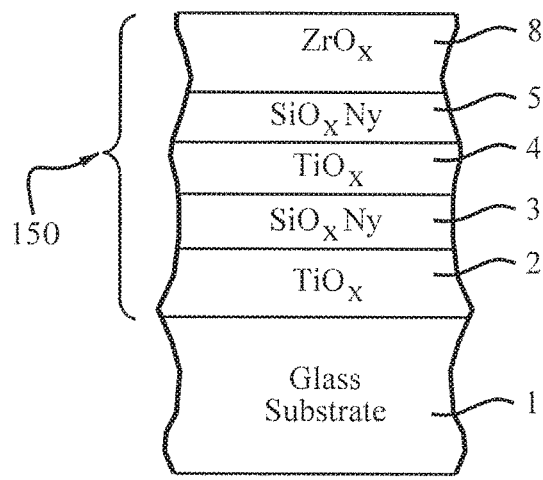
FIG. 10 is cross sectional view of yet another UV reflecting coating on a glass substrate, which may be used in the IG window unit of any of FIGS. 2-3 according to example embodiments of this invention.

FIG. 10 is a cross sectional view of another UV reflecting coating 150 that may be used on substrate 1 in the FIG. 2 or FIG. 3 IG window unit. The coated article shown in FIG. 10 may have, for example, a film side UV reflectance of from about 60-70%, with an example being about 65% (reflecting at least this much UV radiation in at least a substantial part of the range from 300-400 nm). In an example of the FIG. 10 embodiment, layer 2 is of or including titanium oxide (e.g., $TiO_2$), layers 3 and 5 are of or including silicon oxynitride (e.g., which may or may not be doped with aluminum), layer 4 is of or including titanium oxide (e.g., $TiO_2$), and outermost protective layer 8 is of or including zirconium oxide (e.g., $ZrO_2$). In certain example embodiments of the FIG. 10 embodiment of this invention: (i) transparent dielectric layer 2 of or including titanium oxide may be from about 5-40 nm thick, more preferably from about 10-25 nm thick, even more preferably from about 10-20 nm thick, with an example thickness being about 17 nm; (ii) transparent dielectric layer 3 of or including silicon oxynitride may be from about 30-100 nm thick, more preferably from about 40-80 nm thick, even more preferably from about 45-70 nm thick, with an example thickness being about 50 nm; (iii) transparent dielectric layer 4 of or including titanium oxide may be from about 10-80 nm thick, more preferably from about 15-50 nm thick, even more preferably from about 20-40 nm thick, with an example thickness being about 30 nm; (iv) transparent dielectric layer 5 of or including silicon oxynitride may be from about 50-130 nm thick, more preferably from about 70-120 nm thick, even more preferably from about 80-110 nm thick, with an example thickness being about 88 nm; and (v) transparent dielectric protective layer 8 of or including zirconium oxide may be from about 3-30 nm thick, more preferably from about 4-10 nm thick, with an example thickness being about 7 nm. To realize the desired UV reflectance and visible transmission values herein, layer 4 is preferably substantially thicker than titanium oxide based layer 2. For example, in certain example embodiments, titanium oxide based layer 4 is at least about 8 nm thicker (more preferably at least about 10 nm thicker, and most preferably at least about 15 nm thicker) than titanium oxide based layer 2. And silicon oxynitride based layer 5 is at least about 10, 20 or 30 nm thicker than is silicon oxynitride based layer 3 in certain embodiments of the FIG. 2, 3, 10 embodiment of this invention.

Figure 11:
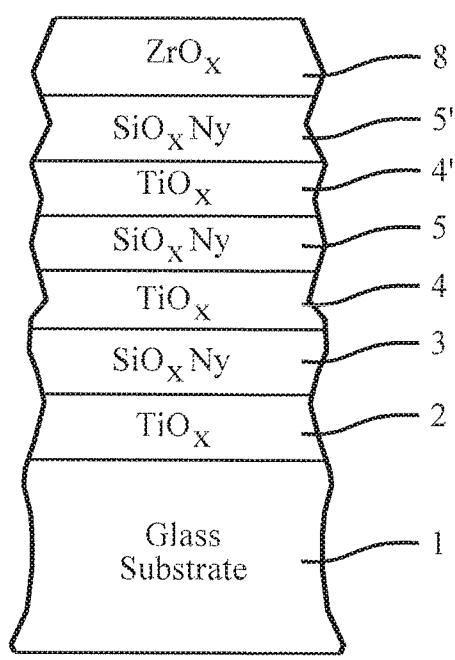
FIG. 11 is cross sectional view of yet another UV reflecting coating on a glass substrate, which may be used in the IG window unit of any of FIGS. 2-3 according to example embodiments of this invention.

FIG. 11 is a cross sectional view of another UV reflecting coating 150 that may be used on the outboard side of substrate 1 in the FIG. 2 or FIG. 3 IG window unit. The coated article shown in FIG. 11 may have, for example, a film side UV reflectance of from about 50-80%, with an example being about 70% (reflecting at least this much UV radiation in at least a substantial part of the range from 300-400 nm). In an example of the FIG. 11 embodiment, layers 2, 4 and 4' are of or including titanium oxide (e.g., $TiO_2$), and layers 3, 5 and 5' are of or including silicon oxynitride (e.g., which may or may not be doped with aluminum), and outermost protective layer 8 is of or including zirconium oxide (e.g., $ZrO_2$). In certain example embodiments of the FIG. 11 embodiment of this invention: (i) transparent dielectric layer 2 of or including titanium oxide may be from about 5-40 nm thick, more preferably from about 10-25 nm thick, even more preferably from about 10-20 nm thick, with an example thickness being about 11 nm; (ii) transparent dielectric layer 3 of or including silicon oxynitride may be from about 30-100 nm thick, more preferably from about 40-80 nm thick, even more preferably from about 45-70 nm thick, with an example thickness being about 63 nm; (iii) transparent dielectric layer 4 of or including titanium oxide may be from about 10-80 nm thick, more preferably from about 15-50 nm thick, even more preferably from about 20-40 nm thick, with an example thickness being about 37 nm; (iv) transparent dielectric layer 5 of or including silicon oxynitride may be from about 10-70 nm thick, more preferably from about 15-60 nm thick, even more preferably from about 20-40 nm thick, with an example thickness being about 32 nm; (v) transparent dielectric layer 4' of or including titanium oxide may be from about 10-80 nm thick, more preferably from about 15-50 nm thick, even more preferably from about 20-40 nm thick, with an example thickness being about 33 nm; (vi) transparent dielectric layer 5' of or including silicon oxynitride may be from about 50-130 nm thick, more preferably from about 70-120 nm thick, even more preferably from about 80-110 nm thick, with an example thickness being about 100 nm; and (vii) transparent dielectric protective layer 8 of or including zirconium oxide for mechanical durability may be from about 3-30 nm thick, more preferably from about 4-10 nm thick, with an example thickness being about 5 nm. To realize the desired UV reflectance and visible transmission values herein, high index layers 4 and 4' are preferably substantially thicker than high index layer 2. For example, in certain example embodiments, titanium oxide based layers 4 and 4' may be at least about 8 nm thicker (more preferably at least about 10 nm thicker, and most preferably at least about 15 nm thicker) than high index titanium oxide based layer 2. And silicon oxynitride based layer 5' is at least about 10, 20 or 30 nm thicker than are silicon oxynitride based layers 3 and/or 5 in certain embodiments of the FIG. 2, 3, 11 embodiment of this invention. In the FIG. 10-11 embodiments, the silicon oxynitride based layers 3, 5 and 5' may have a refractive index n (measured at 550 nm) of from about 1.6 to 1.8, more preferably from about 1.65 to 1.75, and most preferably 1.7. The FIG. 10-11 embodiments are also surprisingly advantageous in that their optical properties have been found to be close to that of uncoated float glass, which makes the coatings 150 essentially invisible to human eyes.

In an example embodiment of this invention, there is provided an IG window unit comprising: a first glass substrate; a second glass substrate; a third glass substrate; wherein the first glass substrate is provided at an exterior side of the IG window unit so as to face an exterior of a building in which the IG window unit is to be mounted; wherein the second glass substrate is provided between at least the first and third glass substrates; wherein the third glass substrate is provided at an interior side of the IG window unit so as to face an interior of a building in which the IG window unit is to be mounted; a patterned UV reflecting coating provided on the first glass substrate and on an exterior surface of the IG window unit so as to face an exterior of a building in which the IG window unit is to be mounted; wherein the first and second glass substrates are laminated to each other via a polymer inclusive laminating film; a low-E coating provided on the a side of the second glass substrate opposite the polymer inclusive laminating film, so that the second glass substrate is located between the low-E coating and the polymer inclusive laminating film; wherein the first glass substrate is located between the patterned UV reflecting coating and the polymer inclusive laminating film; wherein the UV reflecting coating is not part of a low-E coating and does not contain any IR reflecting layer of silver or gold; and wherein the second glass substrate is spaced apart from the third glass substrate via at least an air gap, so that a laminated structure including the first glass substrate, the second glass substrate, and the polymer inclusive laminating film is located on an outboard side of the air gap and on an outboard side of the low-E coating.

In the IG window unit of the immediately preceding paragraph, the UV reflecting coating may comprise first, second, third, and fourth layers in this order moving away from the first glass substrate, and wherein the first and third layers may be high index layers having a refractive index of at least about 2.25 and the second and fourth layers may be low index layers having a refractive index of no greater than 1.8, where refractive indices are measured at 550 nm; wherein the first, second, third and fourth layers may each be dielectric layers that are substantially transparent to visible light; and wherein the IG window unit may have a visible transmission of at least about 50%, and the UV reflecting coating may reflect at least 40% of UV radiation in at least a substantial part of the range from 300-400 nm.

In the IG window unit of any of the preceding two paragraphs, the UV reflecting coating may reflect at least 50% of UV radiation in at least a substantial part of the range from 300-400 nm.

In the IG window unit of any of the preceding three paragraphs, the UV reflecting coating may reflect at least 60% of UV radiation in at least a substantial part of the range from 300-400 nm.

In the IG window unit of any of the preceding four paragraphs, the low-E coating may comprise at least one infrared (IR) reflecting layer comprising silver located between at least first and second dielectric layers.

In the IG window unit of any of the preceding five paragraphs, the low-E coating may comprise first and second infrared IR reflecting layers comprising silver, at least one dielectric layer provided between the first IR reflecting layer and the second glass substrate, at least another dielectric layer provided between the first and second IR reflecting layers, and wherein the low-E coating may have a normal emissivity ($E_n$) of no greater than 0.10 and/or a sheet resistance ($R_s$) of no greater than 8 ohms/square.

In the IG window unit of any of the preceding six paragraphs, the second and third glass substrates may be spaced apart from one another by at least one spacer and/or edge seal so as to define the air gap between the second and third glass substrates.

In the IG window unit of any of the preceding seven paragraphs, the air gap may comprise argon gas.

In the IG window unit of any of the preceding eight paragraphs, the air gap may be filled with gas and/or be evacuated to a pressure less than atmospheric.

In the IG window unit of any of the preceding nine paragraphs, the UV reflecting coating may directly contact the first glass substrate.

In the IG window unit of any of the preceding ten paragraphs, the low-E coating may directly contact the second glass substrate.

In the IG window unit of any of the preceding eleven paragraphs, the polymer inclusive laminating film may be of or include PVB, EVA, and/or SGP.

In the IG window unit of any of the preceding twelve paragraphs, the second and third glass substrates may be spaced apart from each other farther than the first and second glass substrates are separated from each other.

In the IG window unit of any of the preceding thirteen paragraphs, the second and third glass substrates may be spaced apart from each other at least 5 mm farther than the first and second glass substrates are separated from each other.

In the IG window unit of any of the preceding fourteen paragraphs, the IG window unit may have a transmission of no greater than 10% (more preferably no greater than 5%) at 370 nm in all areas including the UV reflecting coating and in areas not including the UV reflecting coating.

In the IG window unit of any of the preceding fifteen claims, the laminating film may have a UV absorption from 350-380 nm of at least 80%, more preferably of at least 90%, and most preferably at least 95%.

In an example embodiment of this invention, there is provided an IG window unit comprising: a first glass substrate; a second glass substrate; a third glass substrate; wherein the first glass substrate is provided at an exterior side of the IG window unit so as to face an exterior of a building in which the IG window unit is to be mounted; wherein the second glass substrate is provided between at least the first and third glass substrates; wherein the third glass substrate is provided at an interior side of the IG window unit so as to face an interior of a building in which the IG window unit is to be mounted; a patterned UV reflecting coating provided on the first glass substrate and on an exterior surface of the IG window unit so as to face an exterior of a building in which the IG window unit is to be mounted; wherein the second and third glass substrates are laminated to each other via a polymer inclusive laminating film; a low-E coating provided on either the second glass substrate or on a side of the first glass substrate opposite the UV reflecting coating, so that the first glass substrate is located between the low-E coating and the UV reflecting coating, and so that the second glass substrate is located between the polymer inclusive laminating film and the low-E coating; wherein the first glass substrate is spaced apart from the second glass substrate via at least an air gap, so that a laminated structure including the second glass substrate, the third glass substrate, and the polymer inclusive laminating film is located on an inboard side of the air gap and on an inboard side of the low-E coating.

In the IG window unit of the immediately preceding paragraph, the UV reflecting coating may comprise first, second, third, and fourth layers in this order moving away from the first glass substrate, and wherein the first and third layers may be high index layers having a refractive index of at least about 2.25 and the second and fourth layers may be low index layers having a refractive index of no greater than 1.8, where refractive indices are measured at 550 nm; wherein the first, second, third and fourth layers may each be dielectric layers that are substantially transparent to visible light; and wherein the IG window unit may have a visible transmission of at least about 50%, and the UV reflecting coating reflects at least 40% of UV radiation in at least a substantial part of the range from 300-400 nm.

In the IG window unit of any of the preceding two paragraphs, the UV reflecting coating may reflect at least 50% of UV radiation in at least a substantial part of the range from 300-400 nm.

In the IG window unit of any of the preceding three paragraphs, the UV reflecting coating may reflect at least 60% of UV radiation in at least a substantial part of the range from 300-400 nm.

In the IG window unit of any of the preceding four paragraphs, the low-E coating may comprise at least one infrared (IR) reflecting layer comprising silver located between at least first and second dielectric layers.

In the IG window unit of any of the preceding five paragraphs, the low-E coating may comprise first and second infrared IR reflecting layers comprising silver, at least one dielectric layer provided between the first IR reflecting layer and the first glass substrate, at least another dielectric layer provided between the first and second IR reflecting layers, and wherein the low-E coating may have a normal emissivity ($E_n$) of no greater than 0.10 and/or a sheet resistance ($R_s$) of no greater than 8 ohms/square.

In the IG window unit of any of the preceding six paragraphs, the first and second glass substrates may be spaced apart from one another by at least one spacer and/or edge seal so as to define the air gap between the first and second glass substrates.

In the IG window unit of any of the preceding seven paragraphs, the air gap may comprise argon gas.

In the IG window unit of any of the preceding eight paragraphs, the air gap may be filled with gas and/or be evacuated to a pressure less than atmospheric pressure.

In the IG window unit of any of the preceding nine paragraphs, the low-E coating and the UV reflecting coating may each directly contact the first glass substrate.

In the IG window unit of any of the preceding ten paragraphs, the polymer inclusive laminating film may comprise PVB, EVA, or SGP.

In the IG window unit of any of the preceding eleven paragraphs, the first and second glass substrates may be spaced apart from each other farther than the second and third glass substrates are separated from each other.

In the IG window unit of any of the preceding twelve paragraphs, the first and second glass substrates may be spaced apart from each other at least 5 mm farther than the second and third glass substrates are separated from each other.

In the IG window unit of any of the preceding thirteen paragraphs, the IG window unit may have a transmission of no greater than 5% at 370 nm in all areas including the UV reflecting coating and/or in all areas not including the UV reflecting coating.

In the IG window unit of any of the preceding fourteen claims, the laminating film may have a UV absorption from 350-380 nm of at least 80%, more preferably of at least 90%, and most preferably at least 95%.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. An IG window unit comprising:
   a first glass substrate;
   a second glass substrate;
   a third glass substrate;
   wherein the first glass substrate is provided at an exterior side of the IG window unit so as to face an exterior of a building in which the IG window unit is to be mounted;
   wherein the second glass substrate is provided between at least the first and third glass substrates;
   wherein the third glass substrate is provided at an interior side of the IG window unit so as to face an interior of a building in which the IG window unit is to be mounted;
   a patterned UV reflecting coating provided on the first glass substrate and on an exterior surface of the IG window unit so as to face an exterior of a building in which the IG window unit is to be mounted;

wherein the first and second glass substrates are laminated to each other via a polymer inclusive laminating film;

a low-E coating provided on the a side of the second glass substrate opposite the polymer inclusive laminating film, so that the second glass substrate is located between the low-E coating and the polymer inclusive laminating film;

wherein the first glass substrate is located between the patterned UV reflecting coating and the polymer inclusive laminating film;

wherein the UV reflecting coating is not part of a low-E coating and does not contain any IR reflecting layer of silver or gold; and wherein the second glass substrate is spaced apart from the third glass substrate via at least an air gap, so that a laminated structure including the first glass substrate, the second glass substrate, and the polymer inclusive laminating film is located on an outboard side of the air gap and on an outboard side of the low-E coating.

2. The IG window unit of claim 1, wherein the UV reflecting coating comprises first, second, third, and fourth layers in this order moving away from the first glass substrate, and wherein the first and third layers are high index layers having a refractive index of at least about 2.25 and the second and fourth layers are low index layers having a refractive index of no greater than 1.8, where refractive indices are measured at 550 nm;

wherein the first, second, third and fourth layers are each dielectric layers that are substantially transparent to visible light; and wherein the IG window unit has a visible transmission of at least about 50%, and the UV reflecting coating reflects at least 40% of UV radiation in at least a substantial part of the range from 300-400 nm.

3. The IG window unit of claim 1, wherein the UV reflecting coating reflects
at least 50% of UV radiation in at least a substantial part of the range from 300-400 nm.

4. The IG window unit of claim 1, wherein the UV reflecting coating reflects at least 60% of UV radiation in at least a substantial part of the range from 300-400 nm.

5. The IG window unit of claim 1, wherein the low-E coating comprises at least one infrared (IR) reflecting layer comprising silver located between at least first and second dielectric layers.

6. The IG window unit of claim 1, wherein the low-E coating comprises first and second infrared IR reflecting layers comprising silver, at least one dielectric layer provided between the first IR reflecting layer and the second glass substrate, at least another dielectric layer provided between the first and second IR reflecting layers, and wherein the low-E coating has a normal emissivity ($E_n$) of no greater than 0.10 and/or a sheet resistance ($R_s$) of no greater than 8 ohms/square.

7. The IG window unit of claim 1, wherein the second and third glass substrates are spaced apart from one another by at least one spacer and/or edge seal so as to define the air gap between the second and third glass substrates.

8. The IG window unit of claim 1, wherein the air gap comprises argon gas.

9. The IG window unit of claim 1, wherein the air gap is filled with gas and/or is evacuated to a pressure less than atmospheric.

10. The IG window unit of claim 1, wherein the UV reflecting coating directly contacts the first glass substrate.

11. The IG window unit of claim 1, wherein the low-E coating directly contacts the second glass substrate.

12. The IG window unit of claim 1, wherein the polymer inclusive laminating film comprises PVB.

13. The IG window unit of claim 1, wherein the second and third glass substrates are spaced apart from each other farther than the first and second glass substrates are separated from each other.

14. The IG window unit of claim 13, wherein the second and third glass substrates are spaced apart from each other at least 5 mm farther than the first and second glass substrates are separated from each other.

15. The IG window unit of claim 1, wherein the IG window unit has a transmission of no greater than 5% at 370 nm in all areas including the UV reflecting coating and in areas not including the UV reflecting coating.

* * * * *